United States Patent [19]

Doctor

[11] 4,384,207

[45] May 17, 1983

[54] DIFFERENTIAL PYROELECTRIC DETECTOR

[75] Inventor: Alan P. Doctor, Ormond Beach, Fla.

[73] Assignee: Eltec Instruments, Inc., Daytona Beach, Fla.

[21] Appl. No.: 228,801

[22] Filed: Jan. 23, 1981

[51] Int. Cl.³ .............................................. G01J 1/00
[52] U.S. Cl. .................................... 250/349; 250/338
[58] Field of Search ........................ 250/338, 342, 349

[56] References Cited

U.S. PATENT DOCUMENTS

| | | | |
|---|---|---|---|
| 3,816,750 | 6/1974 | Liu | 250/338 |
| 3,839,640 | 10/1974 | Rossin | 250/353 |
| 3,896,311 | 7/1975 | Taylor et al. | 250/338 |
| 4,072,864 | 2/1978 | Von Gutfeld | 250/338 |
| 4,225,786 | 9/1980 | Perlman | 250/342 |

FOREIGN PATENT DOCUMENTS 1447372  8/1976  United Kingdom .

Primary Examiner—Bruce C. Anderson
Attorney, Agent, or Firm—Christel, Bean & Linihan

[57] ABSTRACT

A pyroelectric detector comprising a body of pyroelectric material having a front surface for receiving radiation, a rear surface, a relatively thin coating of radiation absorbing and transmitting and electrically conducting material applied to the entire front surface, and a pair of relatively thicker areas of radiation reflecting and electrically conducting material applied to the rear surface in spaced-apart relation. Two heat sensitive charge generators are defined in the two regions of the pyroelectric body between the coating on the front surface and the two areas on the rear surface, and output electrical leads are attached to the two areas on the rear surface. When radiation is absorbed by either of the heat sensitive charge generators, an electrical current flows in a circuit connected to the output leads thereby providing an indication of the radiation.

10 Claims, 4 Drawing Figures ial Pyroelectric Detector

BACKGROUND OF THE INVENTION

This invention relates to the art of pyroelectric transducers, and more particularly to a new and improved differential pyroelectric detector.

One area of use of the present invention is in infrared radiation detectors, although the principles of the present invention can be variously applied. Differential pyroelectric infrared detectors are employed in intrusion alarm systems, and one problem arising in some prior art detectors is that the active area defining the electrodes will have less infrared absorption than the pyroelectric material which is under and between these electrodes. This will cause the active area to be heated by thermal diffusion when the radiation is not impinged on the active area, thereby giving rise to a false or reduced output indication. Another problem with some prior art detectors arises from optical requirements necessitating very thin electrodes and resultant mechanical difficulties involved in attaching wires to such very thin electrodes.

SUMMARY OF THE INVENTION

It is, therefore, a primary object of this invention to provide a new and improved differential pyroelectric detector.

It is a more particular object of this invention to provide such a detector wherein an infrared radiation signal which should be sensed by the detector is not falsely viewed by the detector as changing ambient temperature.

It is a more particular object of this invention to provide such a detector which avoids the problems of attaching wires to relatively thin detector electrodes.

The present invention provides a pyroelectric detector comprising a body of pyroelectric material having a first surface for receiving radiation, i.e. a front surface, a second surface, i.e. a rear surface, a relatively thin coating of radiation absorbing and transmitting and electrically conducting material applied to the front surface, and a pair of relatively thicker areas of radiation reflecting and electrically conducting material applied to the rear surface in spaced apart relation. Two heat sensitive charge generators are defined in the two regions of the pyroelectric body between the coating on the front surface and the two areas on the rear surface, and output electrical leads are attached to the two areas on the rear surface. When radiation is absorbed by either of the heat sensitive charge generators, an electrical current flows in a circuit connected to the output leads thereby providing an indication of the radiation. The uniformly absorbant coating on the front surface of the detector avoids the problem of an erroneous indication in response to radiation incident on a location between the two heat sensitive charge generators. Having the output leads attached to the relatively thick areas on the rear surface of the detector avoids problems frequently encountered in attaching leads to relatively thin electrodes.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

Figure 1:
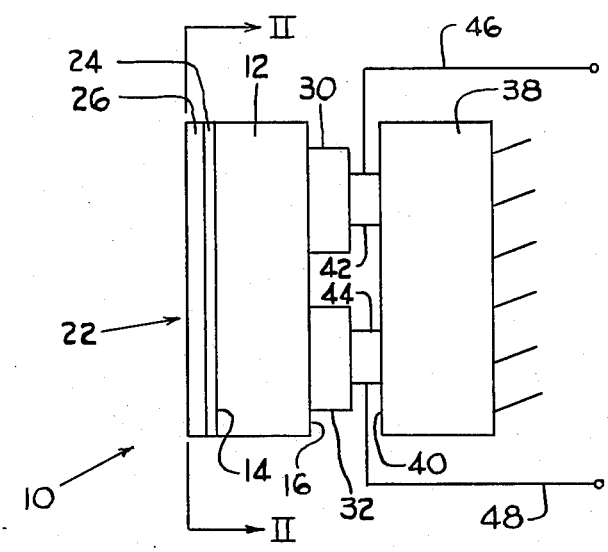
FIG. 1 is a diagrammatic view of a differential pyroelectric detector according to the present invention.

In a basic differential pyroelectric detector an element of pyroelectric material has a pair of spaced apart electrodes on a front surface which receives incident radiation and has an electrode located on the rear surface thereof such that two heat sensitive areas are defined in the pyroelectric material between the front and rear electrodes with wires attached to the front electrodes connecting the detector to an electrical circuit. One problem encountered by such detectors is heat absorption in the region of the pyroelectric material between the spaced-apart heat sensitive areas on the front surface of the detector. In particular, heat from an intruder incident directly on the pyroelectric element between the spaced heat sensitive areas on the front surface of the element can be transmitted equally to the two regions behind the heat sensitive areas with the result that when such detectors are employed in intrusion alarm systems, the presence of an intruder is falsely sensed as changing ambient temperature. In order to minimize or reduce this problem, it has been necessary to provide the front electrodes of such detectors of a highly radiation absorbent material, i.e. the electrode must be more absorbent to incident radiation than the surface of the pyroelectric element between the electrodes. Another problem encountered by such detectors involves attaching electrical leads to the front electrodes which must be very thin so as to reflect a minimum amount of incident radiation. Attaching wires to these very thin electrodes requires consideration of the different thermal expansion coefficients of the output leads, of the means of attachment and of the front electrodes to avoid possible breakage during use. Also, such very thin electrodes are prone to oxidation at the interface between the output lead and the thin electrode.

In accordance with the present invention, a thin coating of electrically conductive and uniformly radiation absorbent material is applied to and covers the entire surface of the pyroelectric element which receives incident radiation, i.e. the front surface. Two relatively thick areas of electrically conductive and radiation reflecting material are applied to the opposite surface of the pyroelectric element, i.e. the rear surface. Two heat sensitive charge generators are defined in the two regions of the pyroelectric element located between the front surface coating and the two rear areas, and output leads are attached to the two areas on the rear surface. With the uniformly absorbent coating on the entire front surface of the pyroelectric element, there is no problem of heat absorption between front electrodes encountered in prior art detectors. With the output leads being attached to the relatively thick spaced areas on the rear surface of the pyroelectric element, there are no problems arising from attachment of wires to very thin front electrodes encountered in prior art detectors. In addition, the relatively thick areas on the rear surface of the pyroelectric element in the detector of the present invention desirably reflect radiation back into the pyroelectric element thereby enhancing its response to the radiation.

Figure 2:
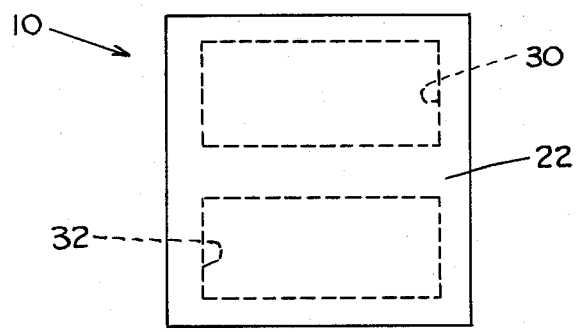
FIG. 2 is a diagrammatic view taken about on line 2—2 in FIG. 1.

Referring now to FIGS. 1 and 2, the differential pyroelectric detector 10 according to the present invention comprises an element of pyroelectric material in the form of a wafer 12 which is a relatively thin rectangular solid body and which in the device shown is of square configuration. Other shapes or configurations can of course be employed. Element 12 has a first surface 14 adapted to be directed toward incident radiant energy, i.e. a front surface, and another surface 16, i.e. a rear surface. Surface 16 is substantially parallel to and oppositely directed from surface 14. Element 12 typically is of lithium tantalate, a crystalline material commonly employed in pyroelectric detectors. Other materials can be used, for example, tri-glycine sulphate, lead zirconate titantate and isomers, lead germanate, and strontium barium niobate, to mention a few. By way of example, in an illustrative device, element 12 has a length of about 2.5 millimeters, a width of about 2.5 millimeters, and a thickness of about 50 microns.

The pyroelectric detector according to the present invention further comprises a relatively thin coating 22 on the first surface of pyroelectric element 12, i.e. on front surface 14, of radiation absorbing and transmitting and electrically conducting material. Coating 22 is applied to surface 14 by vapor deposition, and coating 22 is deposited in such a way as to maximize the optical radiation absorption and transmission and to minimize the optical radiation reflection. Coating 22 is electrically conductive and should have a resistance significantly less than the leakage resistance of the heat sensitive regions of detector 10 which will be described in further detail presently. Preferably the sheet resistance of coating 22 should be in the neighborhood of 200 ohms per square. According to a preferred mode of the present invention, coating 22 comprises a first layer 24 applied directly to surface 14 of pyroelectric element 12 and a second, thicker layer 26 applied to layer 24. Layer 24 serves as an intermediary in promoting the adherence of layer 26 to the pyroelectric element 12, and layer 26 typically is about 3 times the thickness of layer 24. By way of example, in an illustrative device, layer 24 is of chrome and has a thickness of at least 50 angstroms and layer 26 is of nichrome and has a thickness of about 150 angstroms. The overall thickness must be selected such that it is not so great that the reflection properties become dominant and not so thin as to cause the electrical properties to deteriorate. Thus, while the material of layer 26, for example nichrome, has the desired optical and electrical properties, it does not adhere well to non-metallic materials such as pyroelectric materials. The material of layer 24, for example chrome, does adhere to the pyroelectric material and thus serves to join layer 26 to element 12.

The pyroelectric detector 10 further comprises a pair of areas 30 and 32 in spaced-apart relation on the second surface of the pyroelectric element, i.e. on the rear surface 16, and each of the areas 30 and 32 is of radiation reflecting and electrically conducting material, and is relatively thicker than the coating 22 on surface 14. The material of the areas 30 and 32 should be capable of vapor deposition, have good optical reflective and minimal optical transmissive properties, and have a minimum electrical resistance. For example, each of the areas 30 and 32 could comprise a multilayered structure with a layer of chrome deposited on surface 16, a layer of nichrome deposited on the chrome, and gold deposited on the nichrome. Alternatively, each of the layers could be entirely of nichrome or entirely of aluminum. The areas 30 and 32 in the device shown are rectangular in shape and arranged in spaced-apart parallel relation with the ends thereof in substantial lateral alignment. By way of example, an illustrative device, each of the areas 30 and 32 has a length of about 1.6 millimeters, a width of about 0.8 millimeters and a minimum thickness of 1000 angstroms. The spacing between the two areas 30 and 32 is dependent on the optical system and, in particular, on the optical resolution desired. By way of example, in an illustrative device, areas 30 and 32 typically are spaced apart edge to edge a distance of about 0.3 millimeters.

Detector 10 is supported in spaced relation to a mounting block 38 having a generally planar surface 40 facing rear surface 16 of pyroelectric element 12. In particular, two supporting elements 42 and 44 are shown which are of electrically conductive material connected to areas 30 and 32, respectively, and to surface 40. While supporting elements 42 and 44 are shown in FIG. 1 as being generally rectangular solid, they can be of other shapes. Also, the two supporting elements 42 and 44 can be in the form of thin wire links to provide a flexible suspension as described in U.S. Pat. No. 4,218,620 issued Aug. 19, 1980 and entitled "Pyroelectric Detector Having Improved Suspension Means", the disclosure of which is hereby incorporated by reference. While at least two mounting points are needed, additional ones can be employed. The supporting elements 42 and 44 are of electrically conductive material, and being connected to areas 30 and 32 they provide a convenient means for making electrical connections to outside circuitry. For that purpose, output leads 46 and 48 are soldered or otherwise attached to supports 42 and 44, respectively.

Figure 3:
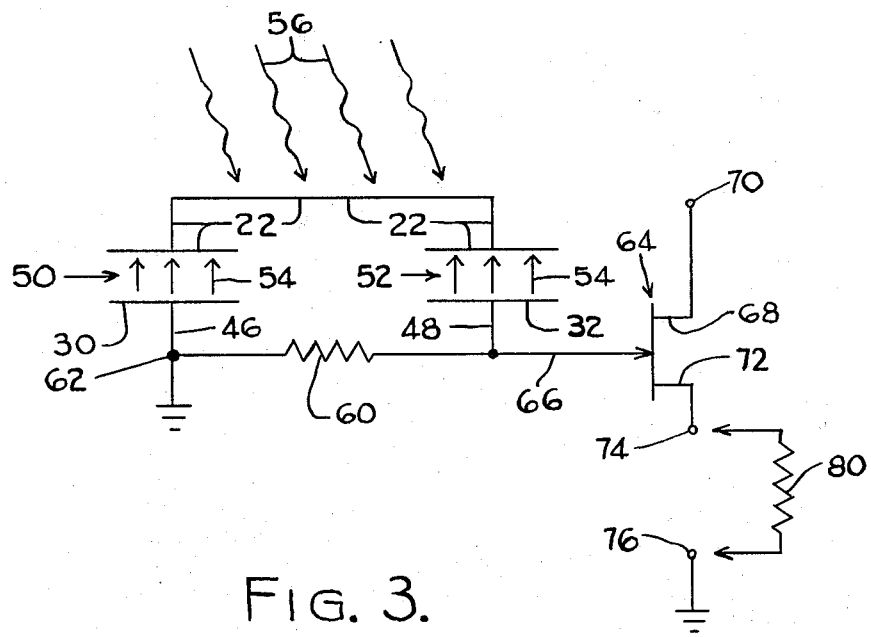
FIG. 3 is a schematic diagram of the equivalent circuit of the detector of FIGS. 1 and 2.

FIG. 3 is an equivalent circuit of the detector 10 of FIGS. 1 and 2 shown connected to measuring circuitry. Detector 10 comprises two heat sensitive charge generators designated 50 and 52 in FIG. 3 defined in the body of pyroelectric element in the regions between coating 22 and corresponding areas 30 and 32, respectively. The pyroelectric material 12 preferably is prepolarized before being incorporated into detector 10 during manufacture. Since the depolarization temperature of lithium tantalate is several hundred degrees Centigrade above temperatures experienced during manufacture, no polarization is required after manufacture. The direction of polarization of the pyroelectric material is shown by arrows 54 in FIG. 3. Incident radiation is represented by arrows 56. The areas 30 and 32 are connected to output leads 46 and 48, respectively, which in turn are connected to measuring circuitry. In particular, a resistor 60 is connected across leads 46,48 and lead 46 also is connected to a circuit ground or reference terminal 62. The measuring circuitry includes a field effect transistor 64 having a gate terminal 66 connected to output lead 48. Drain terminal 68 of transistor 64 is connected to a terminal 70 to which positive bias voltage is applied. Source terminal 72 is connected to one circuit terminal 74, the other terminal 76 being connected to a circuit ground or reference. A measuring or indicating resistor 80 is connected across terminals 74,76.

In operation, the pyroelectric crystal used in forming element 12, such as lithium tantalate crystal, is a grown crystal which is polarized during the growth process such that its dipole molecules are aligned transverse to the faces of the crystal. Thus, the pyroelectric element 12 is fabricated from crystal blanks in the polarized form such that the entire fabricated crystal element is polarized, and the arrows 154 in FIG. 3 indicate the direction of polarization. As a result, infrared energy falling on the crystal will cause movement of charges within the polarized material and all such charges are effective in producing a current flow. The device 10 is so located and disposed during use that the surface 14 of element 12 receives incident infrared radiation to be detected. Each portion of the crystal wafer 12 between one of the areas 30,32 and the coating 22 forms a pyroelectric crystal sensor by virtue of the polarized lithium tantalate. Each pyroelectric crystal sensor so defined is a heat sensitive charge generator. Upon heating of coating 22 by incident electromagnetic radiation, such as infrared radiation, changes in polarization of the crystal occur in response to heating of the crystal thereby inducing surface electrical charges thereon. Thus, the device 10 includes two heat sensitive charge generators where the output current is a result of a change in the spontaneous polarization of the lithium tantalate material in response to the incident radiation absorbed. In particular, the primary effect in the heat sensitive charge generators is generation of a charge difference which is proportional to the rate of change of temperature of the lithium tantalate wafer 12. Once the material is heated, there is a change in the spontaneous polarization which gives rise to a charge difference in the material. Since there is a charge difference which must be equalized, a current flow results in any external circuit connected to element 12.

Thus when a very high resistance is placed across coating 22 and either of the areas 30,32, an external load current flows and produces a small voltage across the resistance load. This voltage may be used as an indication of such radiation. The sensor physically consisting of one of the areas 30 or 32, a corresponding portion of coating 22 and the region of pyroelectric crystal 12 included therebetween thus may be represented by an equivalent electrical circuit consisting of a current generator in parallel with a very small capacitance, representing the inherent capacitance between the electrodes, and in parallel with a very high resistance representing the leakage resistance of the lithium tantalate because of free electrons in the lattice structure and/or slight impurities. The production of charges by the sensor 10 from incident infrared energy is due to the well known pyroelectric phenomenon in the crystal 12 and not to any change or variation in the small interelectrode capacitance.

In the device 10, the two areas 30 and 32 in conjunction with the coating 22 and included region of crystal 12 form two pyroelectric crystal sensors which also are heat sensitive charge generators, and the two sensors or charge generators are physically and thermally in parallel as a consequence of being formed on the common crystal 12. Due to the same polarization of the two sensors, the polarity of the voltage drop across a load resistor, for example resistor 60 in FIG. 3, will be the same for each sensor if each is simultaneously irradiated.

In the circuit of FIG. 3, sensor 10 is connected to measuring circuitry including load resistor 60, transistor 64 and resistor 80. The two heat sensitive charge generators of sensor 10 are connected in series opposing relation in FIG. 3 so that the device 10 is insensitive to changing ambient temperature and is sensitive to the heat sensitive charge generators being irradiated one at a time, such as by a moving body. In particular, the heat sensitive charge generators 50,52 are arranged so that the effects of ambient temperature changes on generators 50,52 cancel each other out. Any increase or decrease in the general level of background infrared radiation affects both generators 50,52 equally so that the resulting current flows through resistor 60 cancel each other out. When, however, incident infrared radiation is received by generators 50,52 one at a time, the resulting current flows through resistor 60 do not cancel but instead provide separate voltage inputs to amplifier 64. Corresponding output signals on terminals 74,76 indicate the sensing of the incident infrared radiation.

One important advantage of the detector of the present invention is that incident infrared radiation to be detected is not confused or incorrectly sensed as changing ambient. In particular, prior art differential pyroelectric detectors have a pair of spaced apart electrodes on the front surface of the pyroelectric element which receives incident radiation, and one problem encountered by such detectors is heat absorption in the region of the pyroelectric material between the spaced-apart heat sensitive areas on the front surface of the detector. When such detectors are employed in intrusion alarm systems, heat from an intruder incident directly on the pyroelectric element between the spaced heat sensitive areas on the front surface of the element can be transmitted equally to the two regions behind the heat sensitive areas with the result that the presence of an intruder is falsely sensed as changing ambient temperature. This problem is avoided in detector 10 of the present invention because with the uniformly absorbent coating 22 on the front surface 14 of pyroelectric element 12, there can be no heat absorption between front electrodes encountered in prior art detectors.

Another important advantage of the detector 10 of the present invention is that the areas 30 and 32 to which the output leads 46 and 48, respectively, are attached through mounts 42 and 44 can be made relatively thick. Attaching leads and/or mounts to relatively thick areas such as areas 30 and 32 is relatively easy. In prior art detectors, on the other hand, output leads often must be attached to relatively thin electrodes which is difficult. This is especially true of the aforementioned prior art detectors wherein output leads are attached to the spaced front electrodes which must be very thin so as to reflect a minimum amount of incident radiation. Attaching wires to such very thin electrodes must take into account the different thermal expansion coefficients of the output leads, of the means of attachment and of the electrodes to avoid breakage during use. Also such very thin electrodes are prone to oxidation at the interface between the output lead and the thin electrode. All of the foregoing problems are avoided by the relatively thick areas 30,32 in detector 10 of the present invention. In addition, the relatively thick areas 30,32 on the rear surface 16 of pyroelectric element 12 desirably reflect radiation lack into element 12 thereby enhancing its response to the radiation.

Figure 4:
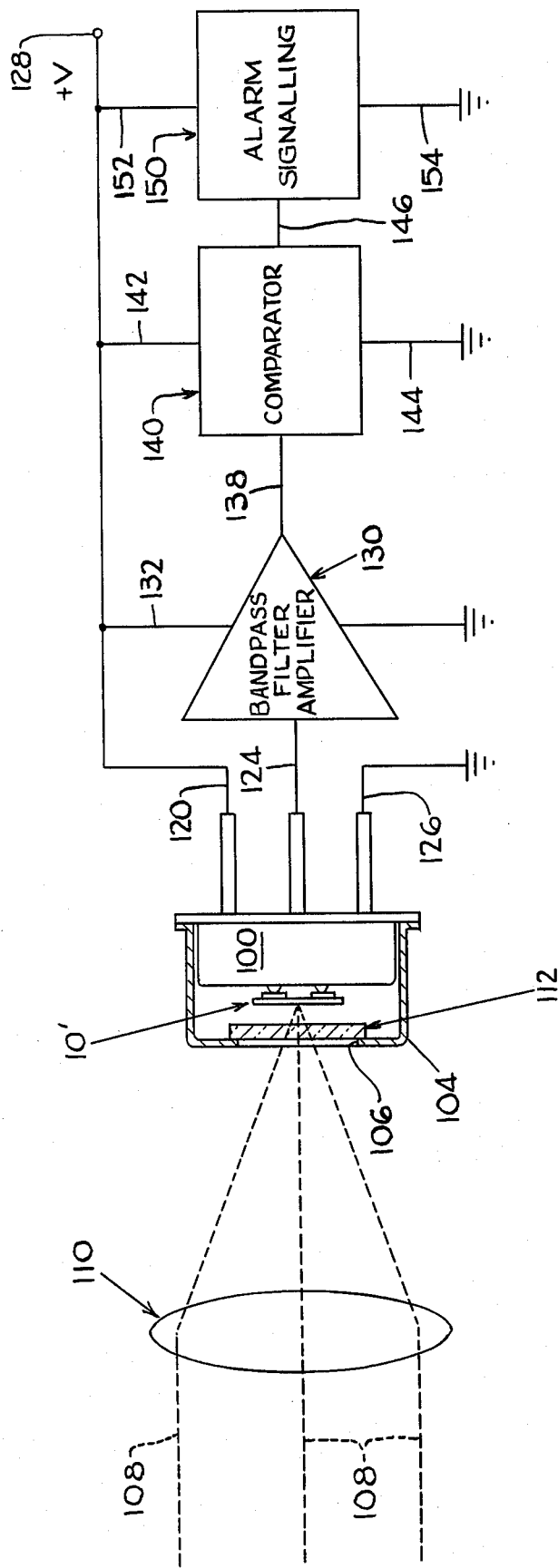
FIG. 4 is a diagrammatic view illustrating the differential pyroelectric detector of the present invention used in an intrusion alarm system.

FIG. 4 illustrates, briefly, the manner in which the detector of the present invention is employed in an intrusion alarm system. A detector generally designated 10' identical to detector 10 of FIGS. 1 and 2 is supported on a base 100 by a plurality of loop elements as described in detail in the previously referenced U.S. Pat. No. 4,218,620. Detector 10' and base 100 are located in a housing 104 in the form of a TO-5 can housing provided with an opening 106 to receive incident infrared radiation indicated by the broken lines 108 focused by a lens 110 in a known manner. An optical filter 112 is placed in housing 104 across window 106, and filter 112 has a narrow bandpass to infrared radiation. Although not shown in FIG. 4, resistor 60, transistor 64 and terminals 70,74 and 76 are connected to device 10' as in FIG. 3 and are included in housing 104, typically on the surface of base 100 facing detector 10'. The terminals 70, 74 and 76 of the circuit as shown in FIG. 3 are connected electrically to the output leads 120,124 and 126 shown in FIG. 4. Lead 120 is connected to a terminal 128 which, in turn, is connected to a source of B+ bias voltage. Lead 124 is connected to the input of a bandpass filter amplifier 130, and lead 126 is connected to an electrical reference or ground. Amplifier 130 is connected by lines 132 and 134 to bias supply lead 120 and to electrical ground, respectively. The output of amplifier 130 is connected by a line 138 to the input of a comparator circuit 140. Comparator 140 is connected by lines 142 and 144 to bias supply lead 120 and to electrical ground, respectively. The output of comparator 140 is connected by a line 146 to the input of an alarm signalling circuit designated 150, and circuit 150 is connected by lines 152 and 154 to bias supply lead 120 and to electrical ground, respectively. The components shown in the system of FIG. 4 typically are contained within a single housing (not shown).

As previously described, increases or decreases in ambient temperature or other background radiation changes which affect equally both of the heat sensitive charge generators of detector 10' cause self-cancelling electrical signals and thus no output signal from detector 10'. Infrared radiation from the body of an intruder moving in the space monitored by the system of FIG. 4 is focused by lens 110 onto one of the heat sensitive charge generators of detector 10', one-at-a-time, providing an output signal on line 124. The amplified output signal is transmitted by line 138 to comparator 140 which, in turn, provides an output signal on line 146 if the signal on line 138 exceeds a predetermined magnitude so as to avoid false alarms from spurious signals or other unwanted effects. An output signal on line 146 activates alarm signalling circuit 150 to cause operation of an appropriate audio, visual or other alarm indication. The system of FIG. 4 benefits from all the advantages provided by the detector of the present invention as described in connection with FIGS. 1-3.

It is therefore apparent that the present invention accomplishes its intended objects. While an embodiment of the present invention has been described in detail, this is for the purpose of illustration, not limitation.

I claim:

1. A pyroelectric detector comprising:
   (a) a body of pyroelectric material having a first surface for receiving radiation and a second surface;
   (b) a relatively thin coating on said first surface of material which is radiation absorbing and transmitting and which is electrically conducting;
   (c) a pair of areas in spaced-apart relation on said second surface, each of said areas being of radiation reflecting and electrically conducting material, each being relatively thicker than said coating on said first surface;
   (d) a first heat sensitive charge generator defined by one of said areas, the portion of said coating in registry with said one area and the region of said body of pyroelectric material therebetween; and
   (e) a second heat sensitive charge generator defined by the other of said areas, the portion of said coating in registry with said other area and the region of said body of pyroelectric material therebetween;
   (f) whereby when radiation is absorbed by either of said heat sensitive charge generators an electric current flows in a circuit connected to said areas thereby providing an indication of said radiation.

2. Apparatus according to claim 1, wherein said body of pyroelectric material is in the form of a slab and said first and second surfaces are substantially oppositely directed and disposed in substantially parallel planes.

3. Apparatus according to claim 1, wherein said pyroelectric material is lithium tantalate.

4. Apparatus according to claim 1, wherein said coating has a sheet resistance of about 200 ohms per square.

5. Apparatus according to claim 1, wherein said coating comprises a first layer applied to said first surface of said body of pyroelectric material and a second layer applied to said first layer.

6. Apparatus according to claim 5, wherein said second layer has a thickness greater than the thickness of said first layer.

7. Apparatus according to claim 5, wherein said first layer is of chrome and said second layer is of nichrome.

8. Apparatus according to claim 1, further including a pair of supporting elements, each secured to a corresponding one of said areas on said second surface of said pyroelectric body, each of said supporting elements also being secured to a mounting surface.

9. Apparatus according to claim 1, further including a high megohm resistor connected electrically across said two areas.

10. Apparatus according to claim 9, further including a transistor amplifier having an input connected to said resistor.

* * * * *